Oct. 20, 1953
P. D. HARVEY
2,656,215
SLIDING DOOR HANGER AND CHECK DEVICE FOR TRUCKS
Filed Aug. 9, 1950
3 Sheets-Sheet 1
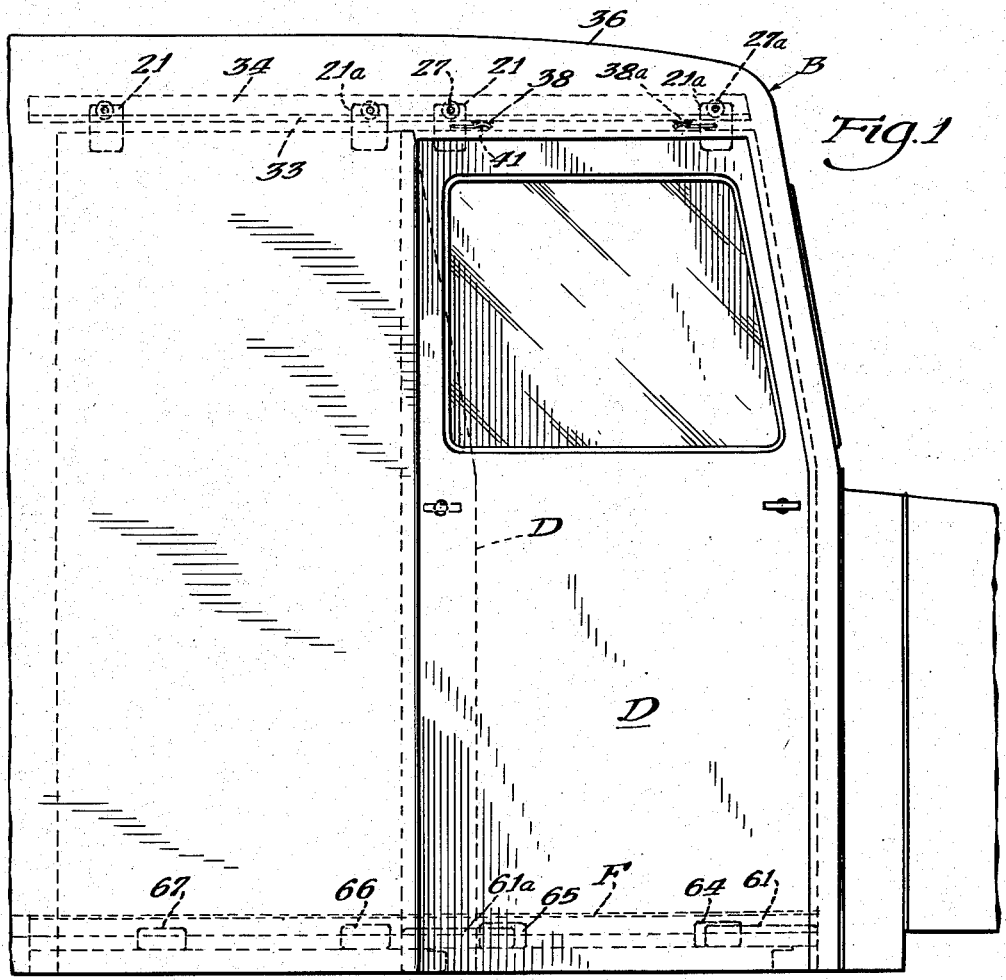
Fig.1
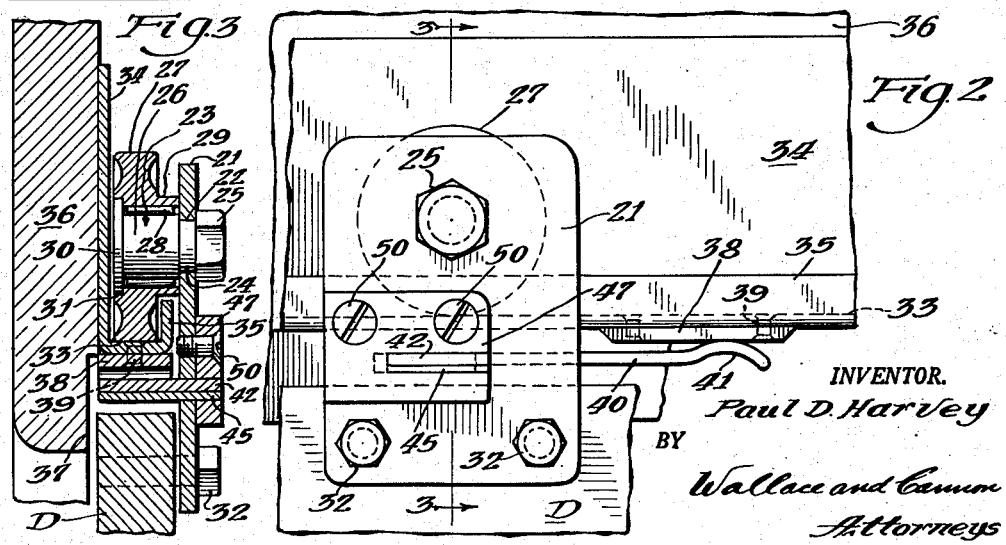
Fig.3
Fig.2
INVENTOR.
Paul D. Harvey
BY
Wallace and Cannon
Attorneys

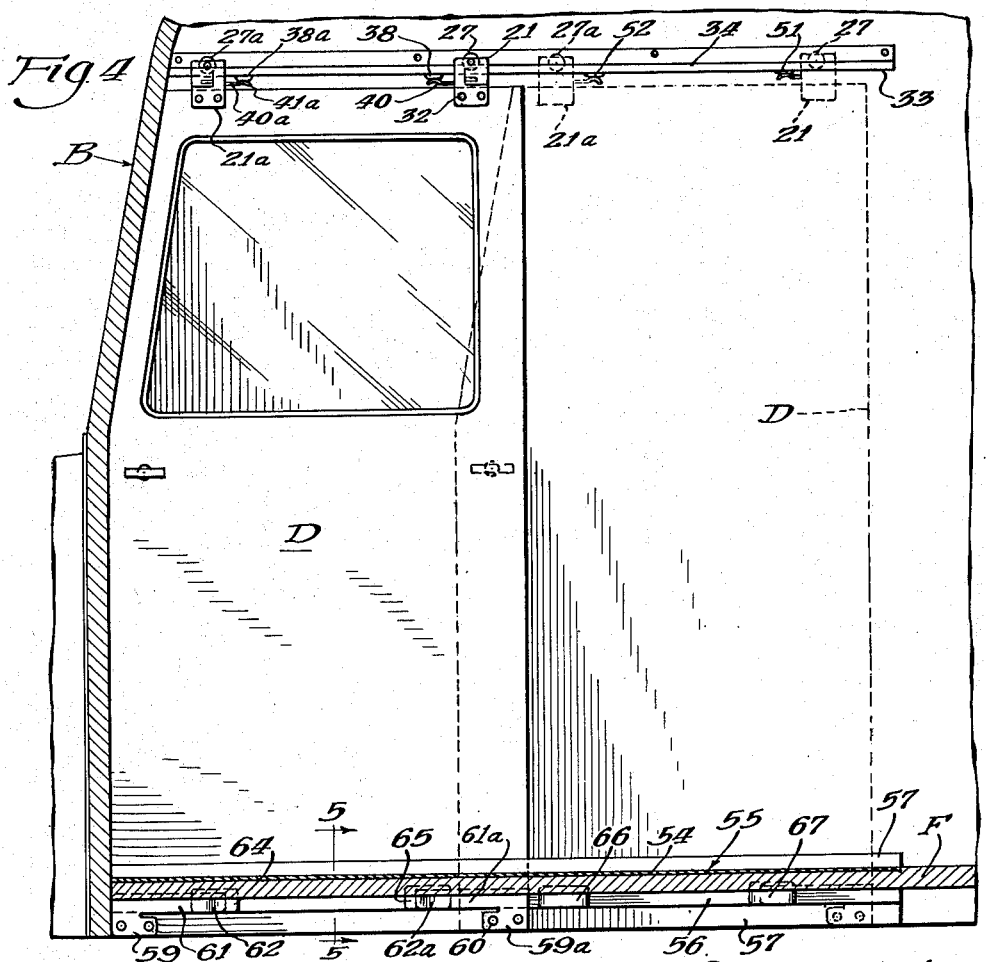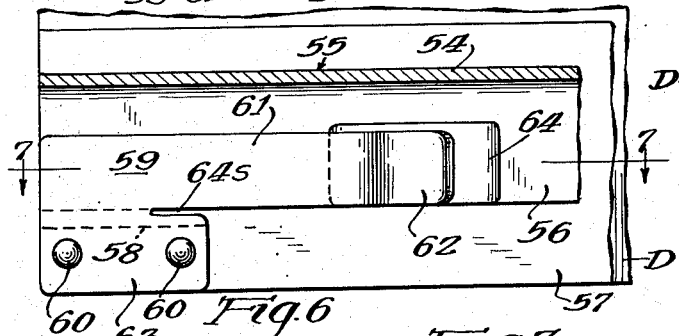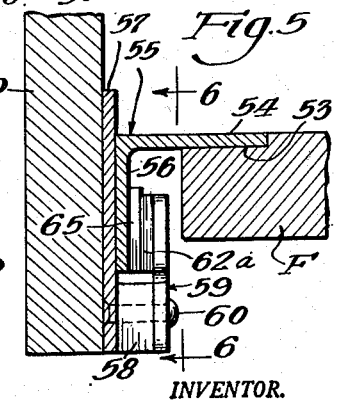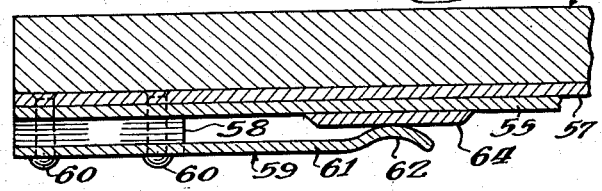

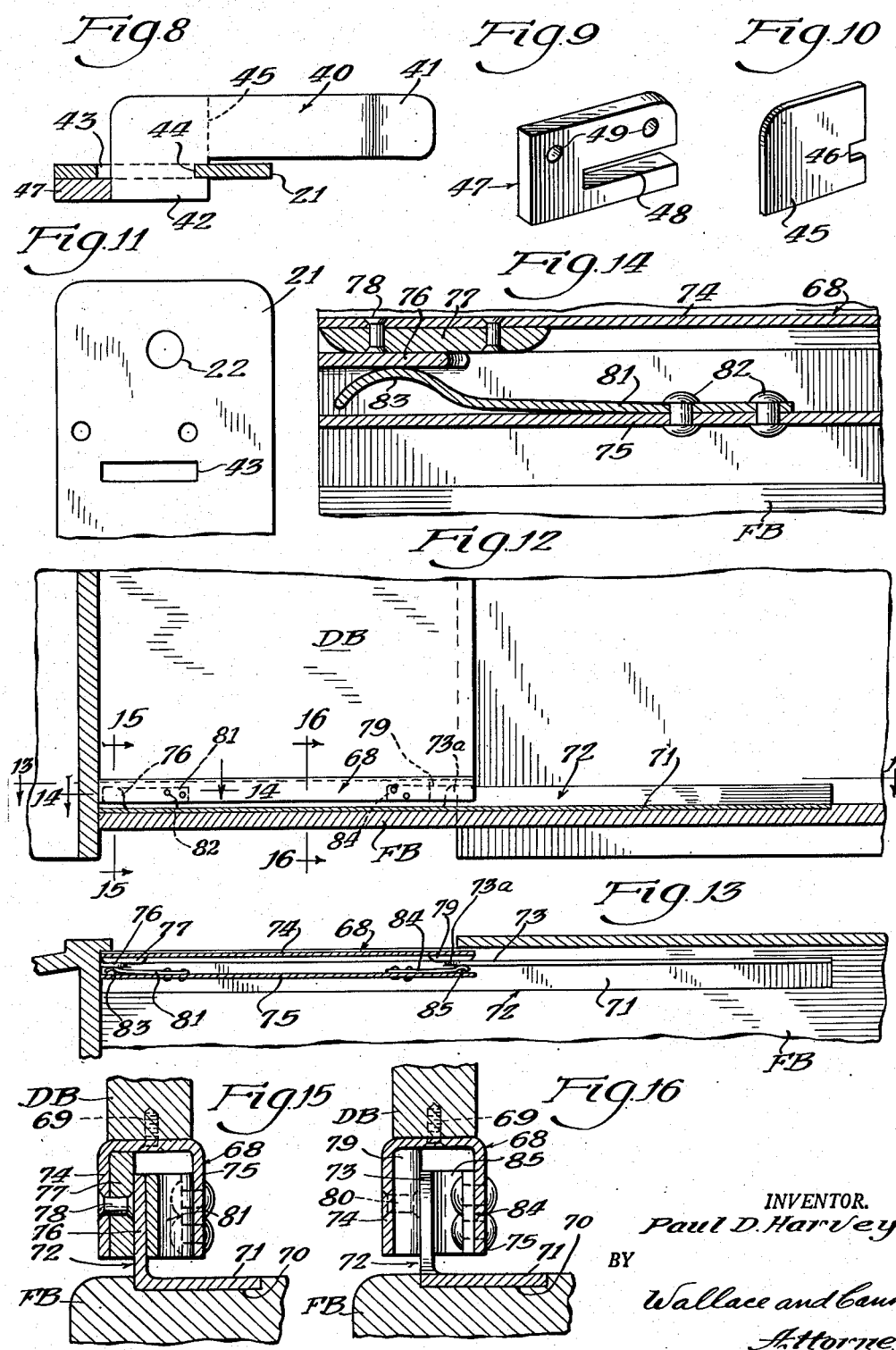

Patented Oct. 20, 1953

2,656,215

UNITED STATES PATENT OFFICE 2,656,215

SLIDING DOOR HANGER AND CHECK DEVICE FOR TRUCKS

Paul D. Harvey, Chicago, Ill.

Application August 9, 1950, Serial No. 178,541

8 Claims. (Cl. 296—47)

This invention relates to doors and particularly to sliding doors adapted for use in automotive vehicles and the like, and especially to means which support the door for sliding movement relative to the vehicle body and which are effective to retain the door in predetermined positions.

In many automotive vehicles, and particularly those employed for delivery purposes, it is advantageous to utilize sliding doors in association with the cab of the vehicle rather than conventional hinge doors. One example where this is a particular advantage is in the instance of delivery trucks employed for newspapers which pull up close to the curb adjacent a newsstand. This usually does not afford room to swing open a conventionally hinged door. When, however, resort is had to a sliding door in such vehicles, the door may be readily opened even though the truck is close to a newsstand. In addition to this, there are, of course, many other instances where sliding doors can be advantageously employed in automotive vehicles and the like.

One of the principal objections to sliding doors, as these have been employed in automotive vehicles heretofore, is that it has been difficult to prevent undesired movement of the door relative to the vehicle body with the result that the door has often rattled during the time the vehicle was in motion. Still another objection to sliding doors in automotive vehicles is the tendency of such doors to move from predetermined positions in which they are disposed when forces are effective thereon during acceleration or deceleration of the vehicle. Sliding doors are particularly subject to the effect of such forces since the sliding doors are movable in the direction in which such forces are effective.

In view of the foregoing, a primary object of my invention is to support a sliding door in an automotive vehicle in a novel manner which is such that undesired movement of the door relative to the vehicle body may be prevented when the door is disposed in predetermined positions such as, for example, the fully closed and fully open positions thereof, and an object ancillary to the foregoing is to releasably retain the door in such position against undesired movement when subjected to forces incidental to acceleration or deceleration of the vehicle in which the door is included.

Another important object of my invention is to suspend a sliding door of the aforesaid character from an overhead track in a novel manner that will permit unrestrained movement of the door along the track in the course of movement thereof from the fully open to the fully closed positions thereof, or vice versa, and an object ancillary to the foregoing is to so suspend the door from a track of the aforesaid character that undesired movement between the door and the track, such as might cause rattling of the door when the vehicle is in motion will be prevented.

Yet another object is to incorporate resilient means in the support for the upper end of the door which cooperate with elements on the supporting track when the door is in the fully closed or fully open positions thereof to releasably retain the door in one or the other of these positions, and an object ancillary to the foregoing is to so construct this arrangement that it will be effective to assist in preventing undesired movement of the door such as might cause rattling thereof while the vehicle is in motion.

Still other objects of the invention are to resort to a novel arrangement at the lower portion of a sliding door of the aforesaid character that will be such as to avoid a draft into the cab of the vehicle past the lower portions of the door; to so construct the arrangement provided for the bottom of the door that ice and snow and the like will be prevented from accumulating therein, such accumulations having occurred in the past and interfered with the sliding of doors included in automotive vehicles.

Another object of this invention is to incorporate resilient means in the arrangement provided for the bottom of a vehicle door which will be effective to releasably retain the door in the fully closed or fully open positions thereof and desirably such means are arranged to prevent undesired movement of the door such as might cause rattling while the vehicle is in motion. Related objects of my invention are to provide an arrangement at the bottom of the door which will enable the hereinabove set forth objects to be realized in those instances where the vehicle door is arranged to extend outwardly of and below the floor of the vehicle in which it is included, and a further object is to enable the hereinabove set forth objects to be realized in those instances where the door is disposed above a portion of the floor of the vehicle in which it is included.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

Fig. 1 is a fragmentary side elevational view of a delivery truck body embodying the present invention;

Fig. 2 is a view showing one of the upper support brackets employed in the arrangement illustrated in Fig. 1 but looking in the direction opposite to Fig. 1;

Fig. 3 is a vertical sectional view taken substantially on the line 3—3 on Fig. 2;

Fig. 4 is an interior view of the arrangement shown in Fig. 1;

Fig. 5 is a vertical sectional view of the arrangement for the lower end of the door and taken substantially on the line 5—5 on Fig. 4;

Fig. 6 is a vertical sectional detail view taken substantially on the line 6—6 on Fig. 5;

Fig. 7 is a horizontal sectional view taken substantially on the line 7—7 on Fig. 6;

Fig. 8 is a detail view of a part of the door retaining arrangement illustrated in Fig. 2;

Figs. 9 and 10 are fragmentary perspective detail views of elements employed with the arrangement shown in Fig. 8;

Fig. 11 is an elevational view of a plate used with the elements that are shown in Figs. 8, 9 and 10;

Fig. 12 is a fragmentary view somewhat similar to Fig. 4 but showing a modified form of arrangement that may be utilized at the bottom of the door;

Fig. 13 is a horizontal sectional detail view taken substantially on the line 13—13 on Fig. 12; and Figs. 14, 15 and 16 are sectional detail views, drawn to an enlarged scale, and taken substantially and respectively on the lines 14—14, 15—15, and 16—16 on Fig. 12.

In the form of my invention shown in Figs. 1 to 11 inclusive of the accompanying drawings, the vehicle body generally indicated by B has a door opening in a side wall near the front end thereof adapted to be closed by a door D shaped complementary to the door opening. The door D is to be slidable from the closed position thereof shown in full lines in Figs. 1 and 4 to the open position thereof shown in dot dash lines shown in these views. My invention has to do with supporting the door D for movement between these two positions and retaining the door firmly in either the fully closed or fully open positions thereof. To this end a novel supporting arrangement is provided at the top of the door D to support the same and another novel arrangement is provided at the bottom of the door D to guide movement thereof and to insure against rattling of the door when in its fully open or fully closed positions.

The arrangement which I have provided at the upper end of the door D is best illustrated in Figs. 2 and 3 and Figs. 8 to 11, inclusive. This arrangement includes a flat substantially rectangular plate 21 which has an opening 22 formed therein substantially midway between the side walls and spaced below the upper edge thereof. A stub shaft generally indicated by 23 has a reduced portion 24 thereon which neatly fits in the opening 22, the part outwardly of the portion 24 being screw threaded to receive a nut 25 which is effective to draw a shoulder at one end of the enlarged bearing portion 26 of the stub shaft 23 into engagement with the inner side of the plate 21 so as to thereby firmly connect the stub shaft 23 to the plate 21. A wheel 27 is mounted about the bearing portion 26 of the stub shaft 23 and desirably a needle or other anti-friction bearing 28 is interposed between the opening in the wheel and the bearing portion 26 to insure free rotative movement of the wheel 27 about the bearing portion. One end of a collar 29 on the wheel 26 is held in engagement with the inwardly disposed face of the plate 21 by having a head portion 30 on the stub shaft 23 disposed in a recess 31 formed in the face of the wheel opposite the portion thereof from which the collar 29 extends.

As best shown in Figs. 1 and 4, the lower edge of the plate 21 is secured by bolts 32 or the like to the upper rail of the door D near the inwardly disposed end thereof and in such a way that the upper edge of the upper rail of the door D is disposed in spaced relation with the periphery of the wheel 27. Also as best shown in Figs. 1 and 4, another plate 21a, substantially similar to the plate 21 and carrying a roller 27a, is secured to the upper rail of the door D near the forward end of this door.

The wheels 27 and 27a are adapted to travel in a track 33 afforded by bending the lower end of a plate 34 into substantially U-shaped formation. As best shown in Fig. 3, the peripheries of the rollers 27 and 27a ride on the bight portion of this substantially U-shaped formation and these rollers are held from displacement from the track 33 by the free and upwardly disposed limb 35 of the just referred to U-shaped portion. The plate 34 is bolted or otherwise suitably secured to the upper rail 36 of the jamb of the door opening. Preferably the inwardly disposed face of the rail 36 along the lower edge thereof is rabbetted as indicated at 37, such rabbetted portion extending to the bottom of the track 33, again as best shown in Fig. 3. This arrangement supports the door D for free movement along the track 33 which is of sufficient length to support the door in the movement thereof between the fully closed and fully open positions thereof illustrated in Figs. 1 and 4.

It is desirable that the door D be retained in either fully opened or fully closed position thereof so as to prevent the door from sliding in the course of acceleration or deceleration of the vehicle in which the door arrangement of this invention is incorporated, and it is also desirable that the door be held against movement relative to the truck body so as to avoid rattling thereof. To this end an arrangement is provided for effectively retaining the door D in either its fully open or fully closed position. This arrangement includes a block as 38, Figs. 1, 2 and 4, which is secured to the lower edge of the track 33 as by rivets 39. The block 38 is connected to the track 33 immediately forward of the position in which the plate 21 will be disposed when the door D is in its fully closed position. As best shown in Fig. 2, the end edges of the block or plate 38 are tapered to facilitate the passage thereonto of the spring finger 40 carried by the plate 21. The plate 40, as best shown in Figs. 2 and 8, is desirably formed from flat plate material and has a rounded end portion 41 at the free end thereof. At the end of the finger 40 opposite the rounded end portion 41 a substantially rectangular extension 42 is provided. This extension 42 is adapted to be inserted through an opening 43 in the plate 21

The extent of the opening 43 is substantially equal to the width of the extension 42 so that the extension 42 may be freely passed into the opening 43. A notch 44 is formed in the extension 42 in the edge thereof disposed toward the rounded end portion 41 and, as best shown in Fig. 8, the notch 44 is adapted to embrace the marginal portions of the plate 21 at the forward end of the slot 43. A gasket plate 45 is provided that is substantially as wide as the extension 42 and which is otherwise congruent with the end of the spring finger 40 opposite the rounded end portion 41. When the extension 42 has been disposed in the opening 43 with the notch 44 embracing the front marginal edge of the slot 43, the gasket plate 45 is slid under or over the spring finger 40 and into the opening 43 and it is then moved so as to have the notch 46 therein embracing the front marginal portion of the slot 43. A block 47, Figs. 2, 8 and 9, has a notch 48 provided therein opening into one edge thereof. The notch 48 is of a width sufficient to neatly embrace those portions of the extension 42 and the plate 45 that extend beyond the slot 43 in the plate 21. The inner edge of the notch 48 engages the rearwardly disposed edges of the extension 42 and the plate 45 to thereby retain the notches 44 and 46 in embracing relation with respect to the front marginal portion of the slot 43. Openings as 49 are provided in the block 48 and screws as 50 are passed therethrough and into tapped openings in the plate 21 to thereby retain the plate 47 with the inner end of the notch 48 engaged with the extension 42 and the plate 45, as aforesaid. The novel connection afforded between the spring finger 40 and the plate 21 enables these elements to be made of plate material by forming and matching operations and thereby the cost of the arrangement is kept at a minimum.

A block 38a is fast to the track 33 immediately rearwardly of the position occupied by the plate 21a when the door D is in its fully closed position. A spring finger 40a is connected to the plate 21a in the same manner as that in which the finger 40 is connected to the plate 21 except that the finger 40a is disposed to extend rearwardly while the finger 40 extends forwardly. When the door D is in its fully closed position, the rounded end portion 41a on the finger 40a is disposed on the block 38a.

Inasmuch as the fingers 40 and 40a are of resilient material, these fingers are placed under tension when the rounded end portions thereof respectively ride up on the blocks 38 and 38a and the resulting tension assists in holding the door D in closed position thereof and against sliding movement, for example, during the acceleration of the vehicle in which my novel door arrangement is enclosed.

A block 51 is secured to the track 33 at a position immediately forward of the position in which the plate 21 will be disposed when the door D is moved to its fully open position shown in dot dash lines in Fig. 4. This disposition of the block 51 is such that the spring finger 40 will ride up on the block when the door D is in its fully open position. Another block 52 is mounted on the track 33 in position to be similarly engaged by the spring finger 40a when the door D is in its fully open position. The cooperation of the spring fingers 40 and 40a respectively with the blocks 51 and 52 assist holding the door D in the fully open position thereof as, for example, during deceleration of the vehicle in which my novel door arrangement is included.

While the tension of the spring fingers 40 and 40a, when engaged with blocks as 38 and 38a, may be sufficient to hold the door D in the fully closed position thereof, I have found it advantageous to provide additional retaining means at the bottom of the door. These latter retaining means also hold the door against objectionable movement such as might cause rattling of the door. Thus, in the form of my invention illustrated in Figs. 1 to 11, inclusive, the lower marginal portion of the door D is disposed to extend below the floor F of the vehicle, as is best shown in Figs. 1, 4 and 5. It is desirable, however, that the lower marginal portion of the door D be retained in a predetermined relation with the free edge of the floor F so as to prevent drafts under the door. This retention of the lower end of the door also prevents the lower marginal portion of the door from moving objectionably relative to the floor F thereby to prevent rattling of the door D during the time the vehicle in which my novel door arrangement is included is in motion.

The novel arrangement provided at the bottom of the door D is best illustrated in Figs. 5, 6 and 7 and by referring thereto it will be noted that the upper surface of the floor F along the edge thereof disposed toward the door D is rabbetted, as indicated at 53, and a portion of the flange 54 of an angle iron, generally indicated by 55, is disposed in this rabbetted portion and is secured in position as by having screws passed through openings therein threaded into the floor F. The flange 56 of the angle iron 55 is spaced from the adjacent edge of the floor F in such an amount as to enable the inwardly disposed face of a plate 57 to be disposed thereagainst when the door D is in its proper vertical position. The plate 57 is secured to the lower marginal portion of the door D as by having screws passed through openings therein threaded to the door D and the plate 57 is coextensive with the width of the door D. The plate 57 and the door D extend below the free edge of the flange 56 of the angle iron 55, as best shown in Fig. 5. A block 58 is rested against the inwardly disposed face of the plate 57 along the lower marginal edge thereof and a plate 59 is disposed to bear against the outwardly disposed face of the block 58, the block 58 and the plate 59 being secured to the plate 57 in any suitable manner as by the rivets 60. The plate 59 is disposed to extend into the space between the adjacent edge of the floor F and the flange 56 of the angle iron 55.

As best shown in Fig. 6, the plate 59 includes a spring finger 61 having a rounded free end portion 62, the finger 61 projecting rearwardly of the main body 63 of the plate 59, Figs. 6 and 7. The rivets 60 pass through the main body portion 63 of the plate 59. In order to increase the resiliency of the spring finger 61, it is advantageous to form a slot as 64S between a portion of the extent of the finger 61 and the main body 63 of the plate 59. As best shown in Fig. 4, the plate 59 is connected to the door D near the forward end thereof with the spring finger 61 extended rearwardly. When the door D is in its fully closed position, the rounded end portion 62 rests on a block 64 that is mounted on the inwardly disposed face of the flange 56 of the angle iron 55.

A plate 59a, similar to the plate 59, is secured to the door D at the rear end and at the lower edge thereof. The plate 59a includes a spring finger 61a similar to the finger 61 but which projects forwardly with respect to the door. A block 65 similar to the block 64 is mounted on the flange 56 of the angle iron 55 in position to have the rounded end portion 62a of the free end of the finger 61a disposed thereon when the door D is in its fully closed position. The cooperation of the spring fingers 61 and 61a respectively with the blocks 64 and 65 assists in retaining the door D in its fully closed position and the tension in the spring fingers 61 and 61a, when they are respectively disposed on the blocks 64 and 65, prevents the door D from moving away from the adjacent edge of the floor F and thereby rattling of the door D is prevented.

Blocks 66 and 67, Fig. 4, are secured to the flange 56 of the angle iron 55 in positions to be respectively engaged by the rounded end portions 62 and 62a when the door D is moved to its fully open position. The engagement of these portions of the fingers 61 and 61a respectively with the blocks 66 and 67 is sufficient to prevent rattling of the door D when it is in its fully open position and this is also effective to prevent undesired movement of the door D from its fully open position.

It will be understood that the fingers 40 and 40a respectively cooperate with the blocks 38 and 38a at the same time as that in which the fingers 61 and 61a respectively cooperate with the blocks 64 and 65. Inasmuch as the fingers are all under tension at this time, the door D is effectively held in its fully closed position and under such circumstances the door D is prevented from rattling. Likewise, the fingers 40 and 40a respectively cooperate with the blocks 51 and 52 at the same time as that in which the fingers 61 and 61a cooperate with the blocks 66 and 67. Inasmuch as, in such circumstances, the fingers are under tension, the door D is effectively held in position against rattling and also against undesired movement from the fully open position thereof.

In some instances it may be desirable to extend the floor of the vehicle, in which my novel door arrangement is to be included, below and beyond the lower edge of the door D. In such circumstances resort may be had to the arrangement illustrated in Figs. 12 to 16 inclusive, of the accompanying drawings. In this arrangement a U-shaped channel generally indicated by 68 has the outer edge of the bight thereof secured to the lower edge of the door DB by screws 69 or the like. As best shown in Figs. 15 and 16 the floor FB extends beyond the outwardly disposed face of the door DB and the upper surface thereof below the door D and inwardly thereof is rabbetted as indicated at 70. The flange 71 of an angle iron generally indicated by 72 is disposed in the rabbet 70 and is secured therein as by having screws passed through openings therein threaded into the floor FB. The other flange 73 of the angle iron 72 is disposed to extend between the limbs 74 and 75 of the substantially U-shaped channel 68, but, as best shown in Figs. 12 and 13, the major portion of the extent of this flange in the part thereof in alignment with the door DB is cut away whereby a pad 76 is afforded at the front end of the door opening. This cutting away of the flange permits unrestricted access to the cab of the vehicle.

The substantially U-shaped channel 68 is coextensive with the width of the door DB and interiorly thereof and in the portion thereof aligned with the front marginal edge of the door a block 77 is mounted on the flange 74 of the channel 68, this block 77 being secured in this position in any suitable manner as by the rivets 78. Another block 79 is secured to the flange 74 in alignment with the rear marginal portion of the door DB and this block is secured in position in any suitable manner as by the rivets 80.

When the door DB is disposed in its fully closed position the block 77 is aligned with the pad 76. At this same time the block 79 is aligned with the portion 73a of the flange 73 immediately rearwardly of the cut-away portion of this flange, and as best shown in Figs. 15 and 16, the arrangement is preferably such that the blocks as 77 and 79 neatly fit between the adjacent faces of the flanges 74 and 73.

It is desirable that the arrangement included at the bottom of the door be such as to prevent undesired movement of the door, such as might cause rattling, and advantageously the arrangement is such that the door will be releasably retained in either the fully open or fully closed positions thereof. To this end a resilient finger 81 is secured to the flange 75 interiorly thereof in any suitable manner, as by having rivets as 82 passed through one end thereof. The opposite end of the spring finger 81 is rounded, as indicated at 83. As best shown in Figs. 13 and 14, when the door DB is in the fully closed position thereof, the rounded portion 83 of the spring finger 81 rests against one face of the pad 76, whereby the finger is placed under tension and the block 77 is held in tight engagement with the adjacent face of the pad 76.

Another spring finger 84 is secured to the flange 75 near the rear marginal portion of the door and includes a rounded portion 85 that is adapted to cooperate with the portion 73a of the flange 73. When the finger 84 is disposed in this position one face of the block 79 is held in tight engagement with the adjacent face of the portion 73a of the flange 73. The tension of the fingers 81 and 84 is such that undesired movement such as might cause rattling, is prevented and, moreover, this tension is sufficient to prevent movement of the door DB from the fully closed position thereof even during acceleration of a vehicle in which my novel arrangement is incorporated.

As best shown in Figs. 12 and 13, the flange 73 rearwardly of the portion 73a thereof is continuous. Therefore, when the door DB is moved from the fully closed position thereof the rounded portion 85 rides along the adjacent face of the flange 73 and holds the block 79 in close engagement with the other face of the flange 73. This arrangement is effective to prevent undesired movement of the door DB such as might cause rattling thereof. Moreover, when the door attains the fully open position thereof, then the rounded portion 83 of the finger 81 rides up on the portion 73a of the flange 73, thereby placing the finger 81 under tension. Since the finger 84 will already be under tension the door will be releasably held in the fully open position thereof even during deceleration of the vehicle.

It will be manifest from the foregoing description that the arrangements that have just been described enable the hereinabove and kindred objects of this invention to be realized. Moreover, while I have illustrated and described the preferred embodiments of my invention, it is to be understood that these are capable of variation and modification.

I claim:

1. In a vehicle having a door opening, a door slidably movable to and from closing position relative to the door opening, a plate secured to said door at the upper marginal edge thereof, a stub shaft carried by said plate, a roller rotatably mounted on said stub shaft, a track carried by the vehicle frame and along which said roller may move in the course of movement of the door to and from opening and closing position, said plate having an opening therein, a yieldable finger having a part disposed in said opening, means securing said finger to said plate, and a block on said track engageable by said resilient finger when the door is in a predetermined position relative to the door opening whereby the finger is placed under tension and is effective to retain the door in said predetemined position.

2. In a vehicle having a door opening, a door slidably movable to and from closing position relative to the door opening, a plate secured to said door at the upper marginal edge thereof, a stub shaft carried by said plate, a roller rotatably mounted on said stub shaft, a track carried by the vehicle frame and along which said roller may move in the course of movement of the door to and from opening and closing position, said plate having an opening therein, a yieldable finger formed from plate material and having an enlarged portion at one end thereof, said enlarged portion having a notch therein adapted to embrace a marginal edge of said opening when said enlarged portion is disposed in said opening, means on said plate for retaining the notch in the aforesaid embracing position to thereby connect the finger to said plate, and a block on said track engageable by said resilient finger when the door is in a predetermined position relative to the door opening whereby the finger is placed under tension and is effective to retain the door in said predetermined position.

3. A support for a door effective to mount such door for sliding movement in a vehicle or the like and comprising a plate having an opening therein, a stub shaft mounted on said plate, a roller mounted on said stub shaft for rotation thereabout and held against displacement therefrom, a yieldable finger having an enlarged portion at one end thereof, said enlarged portion having a notch in the marginal edge thereof adapted to embrace the marginal portion of the opening when said enlarged portion is disposed in the opening, and means secured to said plate and effective to hold said notch in the aforesaid embracing position to thereby secure said yieldable finger to said plate.

4. A support for a door effective to mount such door for sliding movement on a track in a vehicle or the like and comprising a plate having a stub shaft mounted thereon, a roller rotatably supported on said stub shaft in position to rotatably ride on said track, a yieldable spring-like finger detchably connected to said plate and extended in a generally horizontal plane at the back thereof to be yieldable in a generally vertical direction toward and away from said roller, said finger being mounted below and spaced from said roller, said spring-like finger having an extension at one end mounted in a slot in said plate with a notch at one end of said extension embracing a marginal edge of the slot, a block attached to said plate for engaging said extension on the spring-like finger to maintain engagement between said notch and said marginal edge, and said finger being tensioned to bear against the bottom of said track.

5. A support according to claim 4 in which there is such a roller and finger arrangement at spaced-apart points on said plate.

6. A support for a door effective to mount such door for sliding movement on a track in a vehicle or the like and comprising a plate having a stub shaft mounted thereon, a roller rotatably supported on said stub shaft in position to rotatably ride on said track, a yieldable spring-like finger having an enlarged portion at one end connected to said plate through an opening in said plate, said enlarged portion including a notch for embracing a corresponding marginal edge of said opening to thus mount said spring-like finger on said plate, and means on the plate to hold said notch in engagement with said marginal edge, said finger being extended in a generally horizontal plane at the back thereof to be yieldable in a generally vertical direction toward and away from said roller to movably tension the roller on the track.

7. A support according to claim 6 in which there is such a roller and finger arrangement at spaced-apart points on said plate.

8. A support for a door effective to mount such door for sliding movement on a track in a vehicle or the like and comprising a vertical plate formed with a horizontal slot therein, a stub shaft extended at right angles to the plane of said plate above the slot, a roller rotatably mounted on said shaft to roll on said track, a relatively flat yieldable finger having a portion formed with a notch embracing an edge of the relatively flat slot when said portion is disposed in the slot with said finger arranged in a horizontal plane on the plate, and said finger when thus disposed on the plate being just below the roller and yieldable in a generally vertical direction toward and away from said roller whereby the roller is adapted to be movably tensioned on said track.

PAUL D. HARVEY.

References Cited in the file of this patent

UNITED STATES PATENTS

| Number | Name | Date |
|---|---|---|
| 298,794 | Stone | May 20, 1884 |
| 577,799 | Warren | Feb. 23, 1897 |
| 1,066,222 | Remmele | July 1, 1913 |
| 1,136,971 | Nylander | Apr. 27, 1915 |
| 1,194,991 | Gervais | Aug. 15, 1916 |
| 1,610,282 | Hansen | Dec. 14, 1926 |
| 2,028,627 | Sherron | Jan. 21, 1936 |

FOREIGN PATENTS

| Number | Country | Date |
|---|---|---|
| 299,179 | Great Britain | Oct. 25, 1928 |